United States Patent Office 3,020,251
Patented Feb. 6, 1962

3,020,251
RESINOUS COMPOSITIONS DERIVED FROM POLYAMIDES AND ALKYLBENZENE DI-ISOCYANATES
Donald H. Russell, Pennsauken, N.J., assignor to The Atlantic Refining Company, Philadelphia, Pa., a corporation of Pennsylvania
No Drawing. Filed Oct. 15, 1959, Ser. No. 846,558
1 Claim. (Cl. 260—18)

This invention relates to novel compositions of matter, particularly to novel resinous compositions prepared from a polyamide resin and a long chain alkylbenzene diisocyanate to form polymeric thermosetting films or coatings.

As used in this specification and appended claim the term "polyamide" and related terms include those materials prepared by condensing a polymeric fatty acid with an aliphatic polyamine. These polyamides may be liquids, tacky gumlike semi-solids or hard brittle resinous materials. An example of a polyamide which is included in the scope of the definition of this invention is that prepared by the condensation of polymerized linoleic acid with a polyamine. In general, polyamides finding particular utility in the preparation of the novel compositions of this invention are those disclosed and produced according to United States Patent No. 2,379,413.

As used in this specification and appended claim the term "long chain alkylbenzene diisocyanates" and related terms are those alkylbenzene diisocyanates in which the alkyl group contains 4 or more carbon atoms and which alkyl group is either branched or normal in structure. Also intended to be included within the scope of this definition are all of the position isomers of the alkylbenzene diisocyanates.

These long chain alkylbenzene diisocyanates containing 4 or more carbon atoms in the alkyl radical may be prepared by the method disclosed in copending application Serial No. 713,544, filed February 6, 1958, now U.S. Patent No. 2,986,576. In this copending application these alkylbenzene diisocyanates were prepared from the corresponding dinitro alkylbenzenes by first reducing the dinitro compound to the corresponding diamine by either a catalytic hydrogenation step or in a liquid phase reduction reaction. The diamine was then dissolved in a solvent such as ethyl acetate and reacted with an excess of phosgene to convert the carbamyl chlorides to the diisocyanates which were further purified by vacuum distillation.

The reaction product of an alkylbenzene diisocyanate in which the alkyl group or radical contains 3 or less carbon atoms with a polyamide resin is well-known. It is also well-known that this reaction occurs very rapidly even at room temperature and, in fact is essentially instantaneous. The resulting product of this reaction is a substituted urea.

Since the reaction between a polyamide resin and an alkylbenzene diisocyanate in which the alkyl group contains from 0 to 3 carbon atoms is essentially instantaneous, the uses and utility of the resulting products are extremely limited, for example it would not be possible to prepare a mixture of the two reactive components and then attempt to form a protective coating on a structure by applying the mixture in any of the standard methods of application, such as spraying, painting, dipping, etc.

Since the polymeric reaction product of a diisocyanate and a polyamide has properties which are extremely desirable in coating and casting systems, it would be a substantial advance in the art of polymer chemistry if a composition of matter could be produced comprising merely a physical mixture of a polyamide resin and an alkylbenzene diisocyanate which would be stable for extended periods of time. If such a composition could be produced, all of the advantages of the resinous reaction product of a polyamide resin and an alkylbenzene diisocyanate could be realized with none of the attendant disadvantages.

As used in this specification and appended claim, the term "pot life" and related terms shall mean that interval of time between which the polyamide resin and the alkylbenzene diisocyanate exist merely as a physical mixture and the time at which the mixture becomes a fused resinous substance.

One of the standard methods for increasing the pot life of a physical mixture of two reactive components is by the addition of an inert diluent to one or both of the components. This method has been tried unsuccessfully in the case of mixtures of polyamide resins and short chain alkylbenzene diisocyanates (i.e. benzene diisocyanate, toluene diisocyanate, ethylbenzene diisocyanate and propylbenzene diisocyanate). In every instance the addition of an inert diluent such as a saturated hydrocarbon had no effect on the pot life of the mixture of the polyamide resin and the short chain alkylbenzene diisocyanate. In other words, even though a standard method was tried in an attempt to increase the pot life of such mixtures, all such attempts were unsuccessful and the pot life remained zero.

It is, therefore, an object of this invention to provide a novel composition of matter.

It is another object of this invention to provide a novel composition of matter comprising an unreacted physical mixture of a polyamide resin and a long chain alkylbenzene diisocyanate.

It is a further object of this invention to provide a novel composition comprising an unreacted physical mixture of a polyamide resin and a long chain alkylbenzene diisocyanate in which the alkyl radical contains 4 or more carbon atoms and which composition is stable for prolonged periods of time at ambient temperatures and which can be cured thermally to form a polymeric resinous product.

Other objects of this invention will become apparent from the following description and appended claim.

As stated above, the reaction between an alklybenzene diisocyanate in which the alkyl group contains from 0 to 3 carbon atoms and a polyamide resin is well-known. This reaction proceeds instantaneously. Therefore, the physical mixture of an alkylbenzene diisocyanate in which the alkyl group contains from 0 to 3 carbon atoms would have a pot life of zero. Since the pot life of benzene diisocyanate, toluene diisocyanate, ethylbenzene diisocyanate and propylbenzene dissocyanate in admixture with a polyamide resin is zero in every instance, it would be expected that the pot life of a mixture of a butylbenzene diisocyanate, amylbenzene diisocyanate, heptylbenzene diisocyanate, octylbenzene diisocyanate, etc. and a polyamide resin would also be zero.

Contrary to the predicted pot life of a physical mixture of a long chain alkylbenzene diisocyanate and a polyamide resin, it has been found that the pot life of mixtures of these long chain alkylbenzene diisocyanate and polyamide resins is of a substantial length of time.

It has been found that a physical mixture of a long chain alkylbenzene diisocyanate and a polyamide resin has an extended pot life when the two components are admixed in all proportions and also when admixed in the presence of an inert diluent. It is preferred, however, in the practice of this invention for reasons of economy and ease of handling that the long chain alkylbenzene diisocyanate and polyamide resin be admixed in a ratio of from about 1:1 to about 1:3, respectively. These ratios are based on weight percent.

For example, it has been found that a physical mixture of a nonylbenzene diisocyanate and a polyamide resin in the ratio of 1:2, respectively, will remain a physical mixture for an infinite period of time, but may be cured to a fused resinous material at any time merely by the application of heat.

This invention will be further understood by the following examples which are merely intended as illustrative and should not be construed as limitative.

*Example I*

To 100 grams of a benzene diisocyanate there was added 200 grams of a liquid polyamide resin resulting from the condensation of polymerized linoleic acid with a polyamine. Immediately upon the addition of the polyamide resin there occurred a spontaneous exothermic reaction between the components that produced a solid amorphous polymeric material. Thus, it is obvious that the pot life of such a mixture is zero and it is equally obvious that there is no longer present a physical admixture of the two components.

*Example II*

To 100 grams of a benzene diisocyanate dissolved in 900 cc. of toluene there was added 200 grams of the same polyamide resin as that described in Example I. Upon the addition of the polyamide resin to the solution of benzene diisocyanate there occurred a spontaneous exothermic reaction between the components that produced a solid amorphous polymeric material. Thus, it is obvious that the pot life of such a mixture is zero and it is equally obvious that there is no longer present a physical admixture of the two components.

*Example III*

To 100 grams of a toluene diisocyanate there was added 200 grams of a liquid polyamide resin resulting from the condensation of polymerized linoleic acid with a polyamine. Immediately upon the addition of the polyamide resin there occurred a spontaneous exothermic reaction between the components that produced a solid amorphous polymeric material. Thus, it is obvious that the pot life of such a mixture is zero and it is equally obvious that there is no longer present a physical admixture of the two components.

*Example IV*

To 100 grams of a toluene diisocyanate dissolved in 900 cc. of toluene there was added 200 grams of the same polyamide resin as that described in Example III. Upon the addition of the polyamide resin to the solution of toluene diisocyanate there occurred a spontaneous exothermic reaction between the components that produced a solid amorphous polymeric material. Thus, it is obvious that the pot life of such a mixture is zero and it is equally obvious that there is no longer present a physical admixture of the two components.

*Example V*

To 100 grams of an ethylbenzene diisocyanate there was added 200 grams of a liquid polyamide resin resulting from the condensation of polymerized linoleic acid with a polyamine. Immediately upon the addition of the polyamide resin there occurred a spontaneous exothermic reaction between the components that produced a solid amorphous polymeric material. Thus, it is obvious that there is no longer present a physical admixture of the two components.

*Example VI*

To 100 grams of an ethylbenezene diisocyanate dissolved in 900 cc. of toluene there was added 200 grams of the same polyamide resin as that described in Example V. Upon the addition of the polyamide resin to the solution of ethylbenzene diisocyanate there occurred a spontaneous exothermic reaction between the components that produced a solid amorphous polymeric material. Thus, it is obvious that the pot life of such a mixture is zero and it is equally obvious that there is no longer present a physical admixture of the two components.

*Example VII*

To 100 grams of a propylbenzene diisocyanate there was added 200 grams of a liquid polyamide resin resulting from the condensation of polymerized linoleic acid with a polyamine. Immediately upon the addition of the polyamide resin there occurred a spontaneous exothermic reaction between the components that produced a solid amorphous polymeric material. Thus, it is obvious that the pot life of such a mixture is zero and it is equally obvious that there is no longer present a physical admixture of the two components.

*Example VIII*

To 100 grams of a propylbenezene diisocyanate dissolved in 900 cc. of toluene there was added 200 grams of the same polyamide resin as that described in Example VII. Upon the addition of the polyamide resin to the solution of propylbenzene diisocyanate there occurred a spontaneous exothermic reaction between the components that produced a solid amorphous polymeric material. Thus, it is obvious that the pot life of such a mixture is zero and it is equally obvious that there is no longer present a physical admixture of the two components.

In the above examples it is clearly shown that short chain alkylbenzene diisocyanates (i.e. benzene diisocyanate, toluene diisocyanate, ethylbenezene diisocyanate and propylbenzene diisocyanate) cannot exist as merely a physical admixture with a polyamide resin. Examples I, III, V and VII show that the pot life of such a mixture is zero and Examples II, IV, VI and VIII show that, even if one or both of the components is diluted with an inert hydrocarbon diluent, the pot life is still zero.

*Example IX*

To 100 grams of a nonlybenzene diisocyanate there was added 200 grams of a liquid polyamide resin resulting from the condensation of polymerized linoleic acid with a polyamine. Upon the addition of the polyamide resin to the nonylbenzene diisocyanate no observable reaction occurred. There was no measurable evolution of heat and as far as could be observed the mixture was merely physical as between the two components. This mixture remained in this condition at ambient temperatures for a period of time in excess of three months.

*Example X*

To 100 grams of a nonylbenzene diisocyanate dissolved in 400 cc. of toluene there was added 200 grams of a liquid polyamide resin resulting from the condensation of polymerized linoleic acid with a polyamine. Upon the addition of the polyamide resin to the nonylbenzene diisocyanate no observable reaction occurred. There was no measurable evolution of heat and as far as could be observed the mixture was merely physical as between the two components. This mixture remained in this condition at ambient temperatures for a period of time in excess of three months.

*Example XI*

To 100 grams of a decylbenzene diisocyanate there was added 200 grams of a liquid polyamide resin resulting from the condensation of polymerized linoleic acid with a polyamine. Upon the addition of the polyamide resin to the decylbenzene diisocyanate no observable reaction occurred. There was no measurable evolution of heat and as far as could be observed the mixture was merely physical as between the two components. This mixture remained in this condition at ambient temperatures for a period of time in excess of three months.

*Example XII*

To 100 grams of a decylbenzene diisocyanate dissolved in 400 cc. of toluene there was added 200 grams of a liquid polyamide resin resulting from the condensation of polymerized linoleic acid with a polyamine. Upon the addition of the polyamide resin to the decylbenzene diisocyanate no observable reaction occurred. There was no measurable evolution of heat and as far as could be observed the mixture was merely physical as between the two components. This mixture remained in this condition at ambient temperatures for a period of time in excess of three months.

*Example XIII*

To 100 grams of a dodecylbenzene diisocyanate there was added 200 grams of a liquid polyamide resin resulting from the condensation of polymerized linoleic acid with a polyamine. Upon the addition of the polyamide resin to the dodecylbenzene diisocyanate no observable reaction occurred. There was no measurable evolution of heat and as far as could be observed the mixture was merely physical as between the two components. This mixture remained in this condition at ambient temperatures for a period of time in excess of three months.

*Example XIV*

To 100 grams of a dodecylbenzene diisocyanate dissolved in 400 cc. of toluene there was added 200 grams of a liquid polyamide resin resulting from the condensation of polymerized linoleic acid with a polyamine. Upon the addition of the polyamide resin to the dodecylbenzene diisocyanate no observable reaction occurred. There was no measurable evolution of heat and as far as could be observed the mixture was merely physical as between the two components. This mixture remained in this condition at ambient temperatures for a period of time in excess of three months.

In Examples IX to XIV, inclusive, it is clearly shown that a long chain alkylbenzene diisocyanate and a polyamide resin can exist merely as a physical admixture for prolonged periods of time. This is true whether the mixture is composed merely of the alkylbenzene diisocyanate and the polyamide resin or whether one or both of the components is diluted with an inert hydrocarbon diluent.

I claim:

A composition of matter comprising an alkylbenzene diisocyanate wherein the alkyl radical is selected from the group consisting of branched and normal chains and contains from about 9 to about 18 carbon atoms and a polymeric polyamide in a ratio of from about 1:1 to about 1:3, respectively, based on weight percent, said polyamide being the reaction product of polymeric fatty acids containing at least two carboxyl radicals and an aliphatic polyamine containing reactive radicals selected from the group consisting of amine radicals and carboxyl radicals.

References Cited in the file of this patent
UNITED STATES PATENTS

| | | |
|---|---|---|
| 2,241,321 | Schlack | May 6, 1941 |
| 2,858,296 | Stilmar | Oct. 28, 1958 |
| 2,864,780 | Katz et al. | Dec. 16, 1958 |